(12) United States Patent
Nakatani et al.

(10) Patent No.: US 7,206,137 B2
(45) Date of Patent: Apr. 17, 2007

(54) TAKING OPTICAL SYSTEM AND IMAGE SENSING APPARATUS

(75) Inventors: Toru Nakatani, Sakai (JP); Mamoru Terada, Sakai (JP); Kenshi Nabeta, Osaka (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/102,051

(22) Filed: Apr. 8, 2005

(65) Prior Publication Data

US 2006/0132928 A1  Jun. 22, 2006

(30) Foreign Application Priority Data

Dec. 20, 2004  (JP) ............................ 2004-367947

(51) Int. Cl.
*G02B 15/14* (2006.01)
(52) U.S. Cl. ...................................... 359/687; 359/683
(58) Field of Classification Search ................ 359/683, 359/684, 687
See application file for complete search history.

(56) References Cited

U.S. PATENT DOCUMENTS 6,462,886 B1 * 10/2002 Hagimori .................... 359/687

FOREIGN PATENT DOCUMENTS

JP          09-090221 A    4/1997

* cited by examiner

*Primary Examiner*—Ricky Mack
*Assistant Examiner*—William Choi
(74) *Attorney, Agent, or Firm*—Sidley Austin LLP

(57) ABSTRACT

The present invention provides a compact, high-performance, and easy-to-manufacture taking optical system that offers an extremely high zoom ratio. The taking optical system includes, from the subject side, a first lens group having a positive optical power, a second lens group having a negative optical power, a third lens group having a positive optical power, and a fourth lens group having a positive optical power. The taking optical system achieves zooming by the movements of the first to fourth lens groups and focusing by the movement of the fourth lens group. The taking optical system fulfills the following conditions: $0.05 \leq f3/f4 \leq 0.95$ and $7.0 \leq f1/fw \leq 20.0$, where f1, f3, and f4 represent the focal lengths of the first, third, and fourth lens groups, respectively, and fw represents the focal length of the entire taking optical system at the wide-angle end thereof.

9 Claims, 12 Drawing Sheets

FIG.4A
FNO=2.88
W
— d
--- g
----- SC
-0.2  0.2
Spherical aberration, Sine condition
FIG.4B
Y'=3.6
W
----- DM
— DS
-0.2  0.2
Astigmatism
FIG.4C
Y'=3.6
W
-5.0  5.0
Distortion (%)
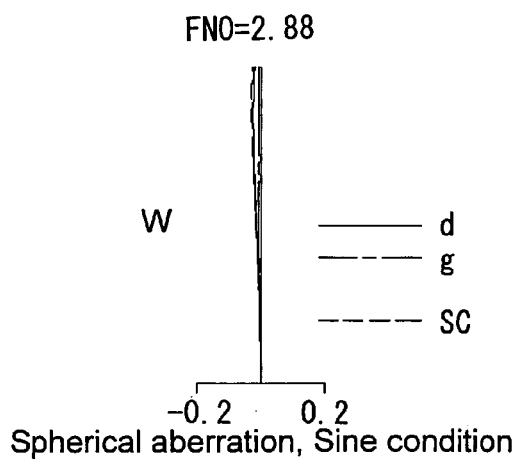
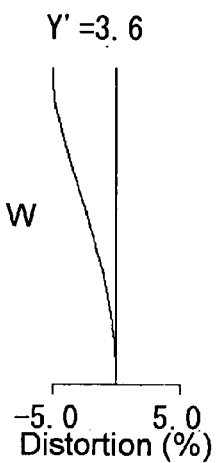
FIG.4D
FNO=3.80
M
— d
--- g
----- SC
-0.2  0.2
Spherical aberration, Sine condition
FIG.4E
Y'=3.6
M
----- DM
— DS
-0.2  0.2
Astigmatism
FIG.4F
Y'=3.6
M
-5.0  5.0
Distortion(%)
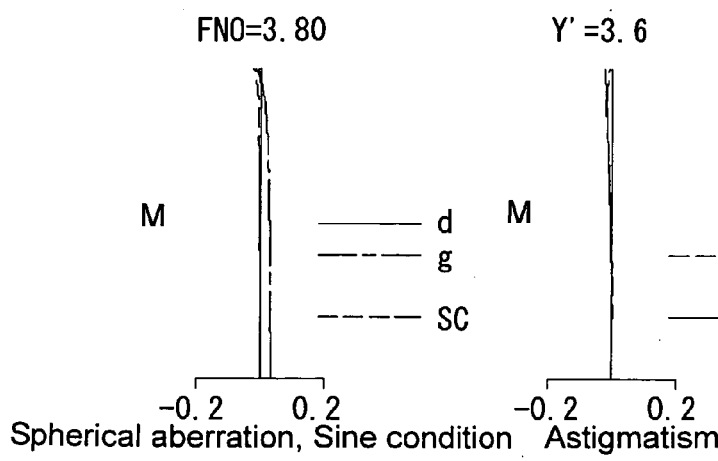
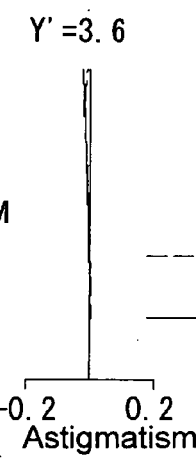
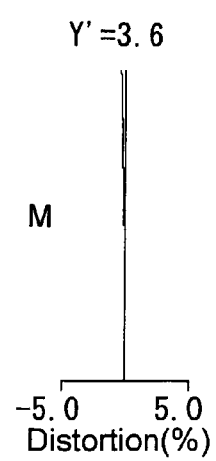
FIG.4G
FNO=4.48
T
— d
--- g
----- SC
-0.2  0.2
Spherical aberration, Sine condition
FIG.4H
Y'=3.6
T
----- DM
— DS
-0.2  0.2
Astigmatism
FIG.4I
Y'=3.6
T
-5.0  5.0
Distortion (%)
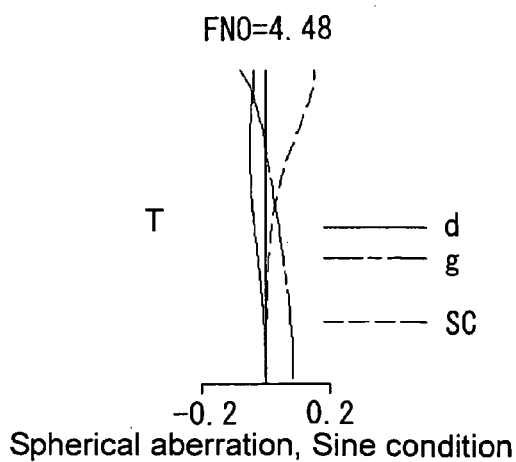
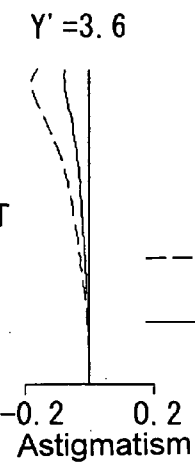
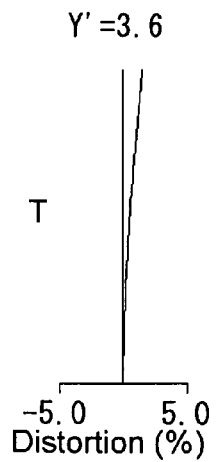

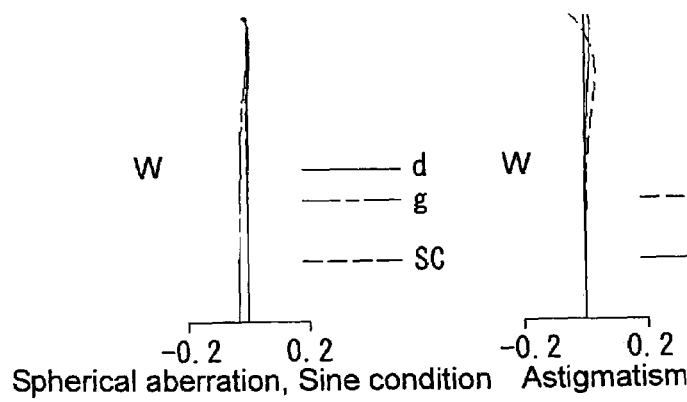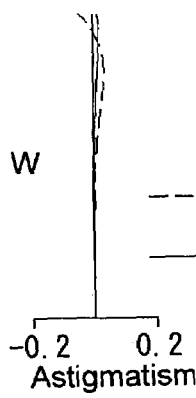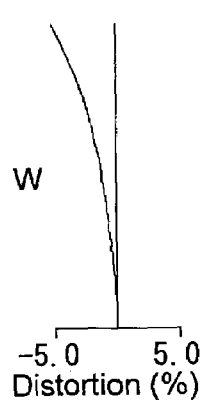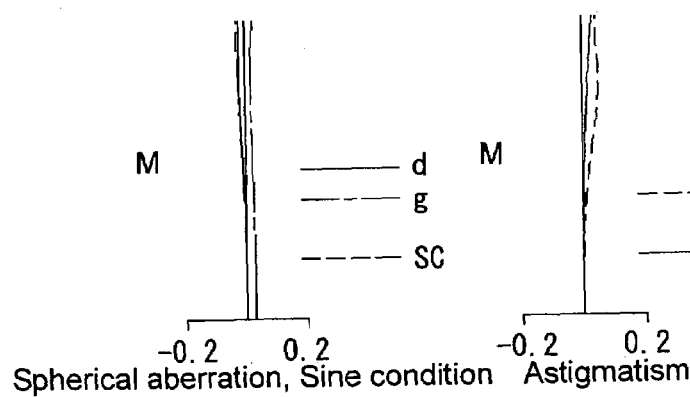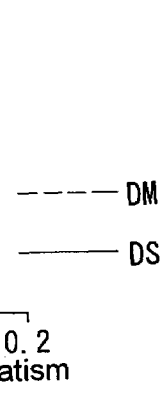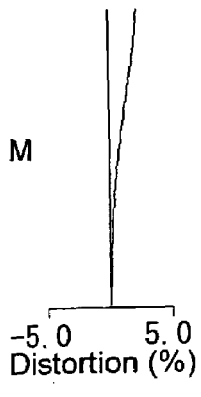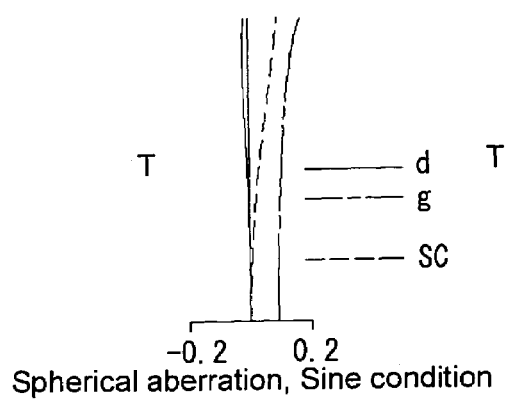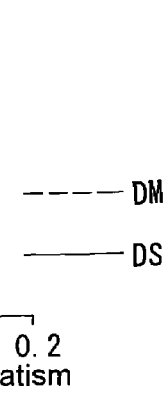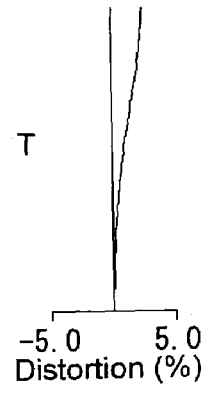

FNO=2.88

W
— d
– – g
– – – SC

-0.2　0.2
Spherical aberration, Sine condition

Y'=3.6

W
– – – DM
— DS

-0.2　0.2
Astigmatism

Y'=3.6

W

-5.0　5.0
Distortion (%)

FNO=4.00

M
— d
– – g
– – – SC

-0.2　0.2
Spherical aberration, Sine condition

Y'=3.6

M
– – – DM
— DS

-0.2　0.2
Astigmatism

Y'=3.6

M

-5.0　5.0
Distortion (%)

FNO=4.60

T
— d
– – g
– – – SC

-0.2　0.2
Spherical aberration, Sine condition

Y'=3.6

T
– – – DM
— DS

-0.2　0.2
Astigmatism

Y'=3.6

T

-5.0　5.0
Distortion (%)

FNO=2.88

W
— d
- - - g
- - - - SC

-0.2  0.2
Spherical aberration, Sine condition

Y'=3.6

W
- - - - DM
——— DS

-0.2  0.2
Astigmatism

Y'=3.6

W

-5.0  5.0
Distortion (%)

FNO=4.00

M
— d
- - - g
- - - - SC

-0.2  0.2
Spherical aberration, Sine condition

Y'=3.6

M
- - - - DM
——— DS

-0.2  0.2
Astigmatism

Y'=3.6

M

-5.0  5.0
Distortion (%)

FNO=4.60

T
— d
- - - g
- - - - SC

-0.2  0.2
Spherical aberration, Sine condition

Y'=3.6

T
- - - - DM
——— DS

-0.2  0.2
Astigmatism

Y'=3.6

T

-5.0  5.0
Distortion (%)

FIG.12A
FNO=2.88
W
— d
--- g
---- SC
-0.2  0.2
Spherical aberration, Sine condition
FIG.12B
Y'=3.6
W
---- DM
— DS
-0.2  0.2
Astigmatism
FIG.12C
Y'=3.6
W
-5.0  5.0
Distortion (%)
FIG.12D
FNO=4.00
M
— d
--- g
---- SC
-0.2  0.2
Spherical aberration, Sine condition
FIG.12E
Y'=3.6
M
---- DM
— DS
-0.2  0.2
Astigmatism
FIG.12F
Y'=3.6
M
-5.0  5.0
Distortion (%)
FIG.12G
FNO=4.90
T
— d
--- g
---- SC
-0.2  0.2
Spherical aberration, Sine condition
FIG.12H
Y'=3.6
T
---- DM
— DS
-0.2  0.2
Astigmatism
FIG.12I
Y'=3.6
T
-5.0  5.0
Distortion (%)
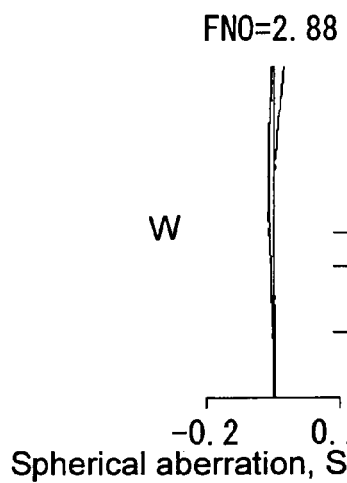
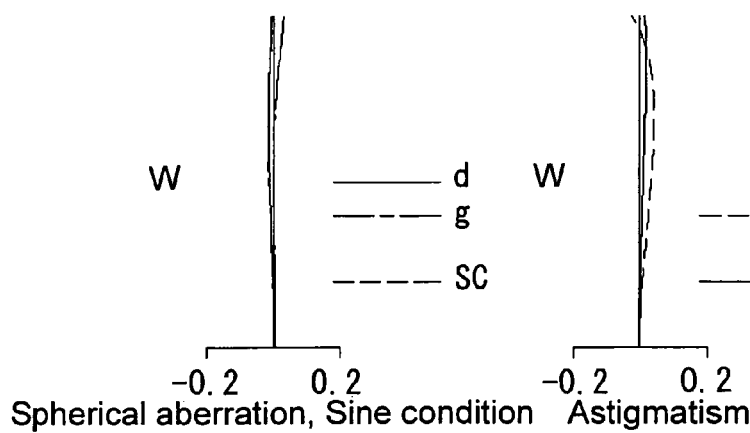
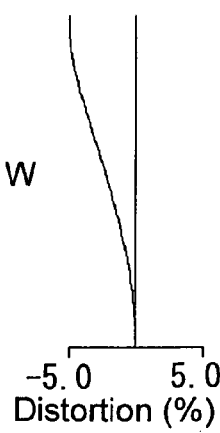
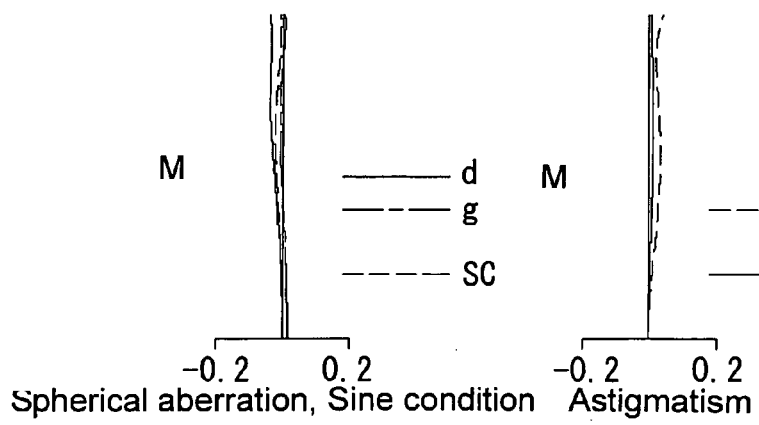
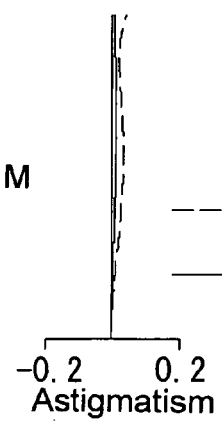
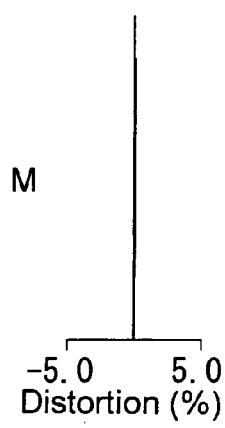
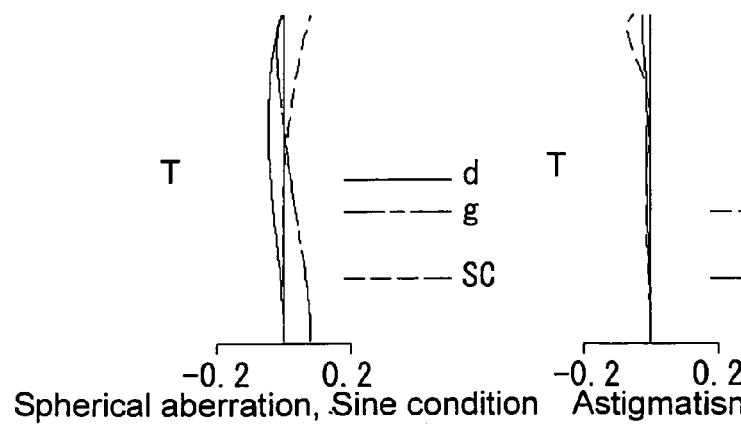
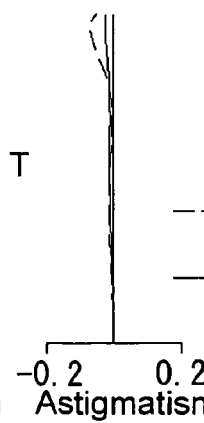
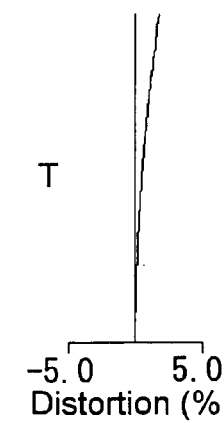

TAKING OPTICAL SYSTEM AND IMAGE SENSING APPARATUS

This application is based on Japanese Patent Application No. 2004-367947 filed on Dec. 20, 2004, the contents of which are hereby incorporated by reference.

BACKGROUND OF THE INVENTION

1. Field of the Invention

The present invention relates to a taking optical system and an image sensing apparatus, and particularly to a taking optical system that offers a variable image sensing magnification and a high zoom ratio.

2. Description of Related Art

As personal computers become widespread, digital cameras, which permit easy acquisition of images, have been becoming widespread in recent years. It is nowadays common to incorporate a digital camera into a data processing device such as a mobile computer, a cellular phone, or a personal digital assistant (PDA). Under these circumstances, increasingly compact digital still cameras are sought after, resulting in demands for further down-sizing of taking optical systems.

On the other hand, in image sensors that are used to convert light into an electrical signal, various advancements have been made for higher and higher performance in terms of, for example, the number of pixels they have, creating a shortening tendency of the product cycles of digital cameras. Thus, taking optical systems are now required not only to be compact but also to offer high performance and be easy to manufacture.

Digital cameras typically employ, as their taking optical systems, zoom optical systems. Such zoom optical systems are conventionally designed to offer a zoom ratio of typically 2 to 5, but are now required to offer twice as high a zoom ratio. In fact, there have conventionally been known some zoom optical systems that meet this requirement. Japanese Laid-open Patent Publication No. H09-90221, for example, discloses a zoom optical system that offers a zoom ratio of 15 or more.

Although such conventional zoom optical systems offer high zoom ratios, they are not satisfactorily compact, nor do they offer satisfactorily high performance. The zoom optical system disclosed in the above-mentioned publication, for example, has an unduly large total length at the wide-angle end, and suffers from unsatisfactorily corrected aberrations.

SUMMARY OF THE INVENTION

The present invention has been made in view of the conventionally experienced inconveniences discussed above, and it is an object of the invention to provide a compact, high-performance, and easy-to-manufacture taking optical system that offers an extremely high zoom ratio. It is another object of the invention to provide a compact, high-performance, and low-cost image sensing apparatus that incorporates such a taking optical system.

In order to achieve the above object, according to one aspect of the present invention, a taking optical system for focusing light from a subject on an image sensor has at least, from the subject side, a first lens group having a positive optical power, a second lens group having a negative optical power, a third lens group having a positive optical power, and a fourth lens group having a positive optical power. The taking optical system achieves zooming by varying at least one distance between the lens groups. The taking optical system fulfills the following conditions:

$$0.05 \leq f3/f4 \leq 0.95 \quad (1)$$

$$7.0 \leq f1/fw \leq 20.0 \quad (2)$$

where f3 represents the focal length of the third lens group; f4 represents the focal length of the fourth lens group; f1 represents the focal length of the first lens group; and fw represents the focal length of the entire taking optical system at the wide-angle end thereof (minimum focal length).

Formula (1) appropriately defines the optical power ratio of the third lens group relative to the fourth lens group. When the value of f3/f4 exceeds the upper limit of Formula (1), the power of the fourth lens group becomes higher, thus resulting in larger aberrations occurring in the fourth lens group, which makes it difficult to satisfactorily correct especially curvature of field from the wide-angle end to the telephoto end (longest focal length). When focus adjustment (focusing) is made by the movement of the fourth lens group, fluctuations in the aberrations caused by focusing, especially the fluctuations in the curvature of field and the color aberration, increase. In order to correct them satisfactorily, addition of a lens, addition of an aspheric surface, etc. is required, which is not preferable from the view points of downsizing and easier manufacture.

On the other hand, when the value of f3/f4 does not reach the lower limit of Formula (1), the power of the third lens group becomes higher, thus resulting in larger aberrations, especially larger spherical aberration, occurring in the third lens group. In order to correct them satisfactorily, addition of a lens, addition of an aspheric surface, etc. is required, which is also not preferable. When focusing is achieved by the movement of the fourth lens group, the amount of movement made by the fourth lens group during focusing becomes too large, which is not preferable.

The taking optical system that offers even higher performance is provided by fulfilling the following Formula (1)' instead of Formula (1):

$$0.15 \leq f3/f4 \leq 0.85 \quad (1').$$

In Formula (2), the focal length of the first lens group is divided by the focal length at the wide-angle end so as to define the appropriate power range of the first lens group. When the value of f1/fw does not reach the lower limit of Formula (2), the power of the first lens group becomes higher, which is preferable from the view point of decreasing the front lens diameter. However, the higher power results in larger aberrations, especially the curvature of field and distortion. In order to correct them satisfactorily, addition of a lens or addition of an aspheric surface is required, which is not preferable from the view points of downsizing and easier manufacture. When the value of f1/fw exceeds the upper limit of Formula (2), this is advantageous from the view point of correcting the aberrations, but it inevitably causes an increase in the front lens diameter and thus upsizing resulting from this increase, which is not preferable.

The taking optical system that offers even higher performance is provided by fulfilling the following Formula (2)' instead of Formula (2):

$$7.5 \leq f1/fw \leq 17.0 \quad (2').$$

The following Formula (3) may be fulfilled:

$$0.05 \leq f3/ft \leq 0.25 \quad (3),$$

where ft is the focal length of the entire taking optical system at the telephoto end.

In Formula (3), the focal length of the third lens group is divided by the focal length at the telephoto end so as to define the appropriate power range of the third lens group. When the value of f3/fw does not reach the lower limit of Formula (3), the power of the third lens group becomes higher, thus resulting in larger aberrations, especially larger spherical aberration, occurring in the third lens group. In order to correct them satisfactorily, addition of a lens, addition of an aspheric surface, etc. is required, which is not preferable from the view points of downsizing and easier manufacture. When the value of f3/fw exceeds the upper limit of Formula (3), this is advantageous from the view point of correcting the aberrations, but requires the space in front of and at the back of the third lens group to be largely changed upon zooming, thus unfavorably resulting in the lens having a longer full length.

The taking optical system that offers even higher performance is provided by fulfilling the following Formula (3)' instead of Formula (3):

$$0.1 \leq f3/ft \leq 0.22 \quad (3').$$

The following Formula (4) may be fulfilled:

$$-0.12 \leq f2/ft \leq -0.05 \quad (4),$$

where f2 is the focal length of the second lens group and ft is the focal length of the entire taking optical system at the telephoto end.

In Formula (4), the focal length of the second lens group is divided by the focal length at the telephoto end so as to define the appropriate power range of the second lens group. When the value of f2/fw exceeds the upper limit of Formula (4), the power of the second lens group becomes too high, thus resulting in larger aberrations, especially larger curvature of field and distortion, occurring in the second lens group. In order to correct them satisfactorily, addition of a lens, addition of an aspheric surface, etc. is required, which is not preferable from the view points of downsizing and easier manufacture. When the value of f2/fw does not reach the lower limit of Formula (4), this is advantageous from the view point of correcting the aberrations, but requires the space in front of and at the back of the second lens group to be largely changed upon zooming, thus unfavorably resulting in the lens having a longer full length.

The taking optical system that offers even higher performance is provided by fulfilling the following Formula (4)' instead of Formula (4):

$$-0.10 \leq f2/ft \leq -0.065 \quad (4').$$

The taking optical system has, in addition to the first to fourth lens groups, only a fifth lens group located closer to the image sensor side than the fourth lens group, and can achieve focal adjustment by moving the fourth lens group.

The fulfillment of Formulae 1 and 2 permits the fourth lens group to have a relatively small power and thus simple structure. The use of this fourth lens group in focusing permits quick focusing and also easily suppresses fluctuations in the aberrations caused by focusing. Further, the presence of the fifth lens group increases the degree of freedom in controlling the power and the exit pupil position of the fourth lens group. The fifth lens group is located in the vicinity of the image surface, and does not suffer from large aberrations, so that its power can be changed relatively freely.

The positive power of the fourth lens group can be more decreased when the fifth lens group has a positive power rather than a negative power, which is preferable from the viewpoint of correcting the aberrations. Further, the fifth lens group is fixed during zooming and focusing. Forming the fifth lens group by one lens permits easy structure of a lens barrel, which is preferable. Moreover, in this construction, when an optical low-pass filter or an infrared cut filter is to be provided, it is convenient to provide a sealing structure including these filters. This provides an advantage in preventing dust adhesion to the image sensor and the filters.

The first lens group may be moved to achieve zooming, and the following condition may be fulfilled:

$$0.5 \leq TLw/ft \leq 1.0 \quad (5)$$

where TLw represents a distance at the wide-angle end between the surface of the first lens group located closest to the subject and the image surface.

Formula (5) defines an appropriate relationship between the full length at the wide-angle end and the focal length at the telephoto end, i.e., the longest focal length. When a large zoom ratio is to be ensured, if the value of TLw/ft exceeds the upper limit of Formula (5), the full length at the wide-angle end becomes large or the angle of view at the wide-angle end becomes large. The increase in the full length at the wide-angle end directly has an adverse effect on downsizing. Further, the increase in the angle of view at the wide-angle end results in an increase in the first lens diameter, which indirectly has an adverse effect on the downsizing.

When the value of TLw/ft does not reach the lower limit of Formula (5), the full length at the wide-angle end becomes too small or the zoom ratio becomes too large, thus making it difficult to ensure high performance. In order to ensure high performance, the number of lenses or the number of aspheric surfaces need to be increased, which hinders easy manufacture.

The taking optical system that is more compact and offers even higher performance is provided by fulfilling the following Formula (5)' instead of Formula (5):

$$0.75 \leq TLw/ft \leq 1.0 \quad (5)$$

The taking optical system may have between the second lens group and the third lens group an aperture stop that moves together with the third lens group. This permits the aperture stop to be always located around the center area of the entire taking optical system, thus making it easy to ensure high performance and achieve downsizing.

The third lens group may include a convex lens element that is located closest to the subject and has a positive power, and a meniscus lens element that is located closest to the image sensor and has a negative power. This easily suppresses the aberrations caused by the third lens group.

The fourth lens group may include only a cemented lens element formed of a lens element having a positive power and a lens element having a negative power, which are cemented together by adhesive. In order to downsize the zoom optical system, it is preferable to perform rear focusing, in which focal adjustment is made with the lens group located closest to the image sensor. In this case, forming the fourth lens group for performing focal adjustment by two lenses permits a drive force required for the focal adjustment to decrease and also permits quick focal adjustment.

In order to achieve the above-mentioned object, the present invention includes an image taking apparatus, an image sensor, and the above-mentioned taking optical system. This image taking apparatus is provided as a compact, high-performance, and low cost apparatus with improved characteristics of the taking optical system.

BRIEF DESCRIPTION OF THE DRAWINGS

FIGS. 4A to 4I are diagrams showing the aberrations observed in the digital camera according to the first embodiment;

FIGS. 6A to 6I are diagrams showing the aberrations observed in the digital camera according to the second embodiment;

FIGS. 12A to 12I are diagrams showing the aberrations observed in the digital camera according to the fifth embodiment.

DETAILED DESCRIPTION OF PREFERRED EMBODIMENTS

Figure 1A:
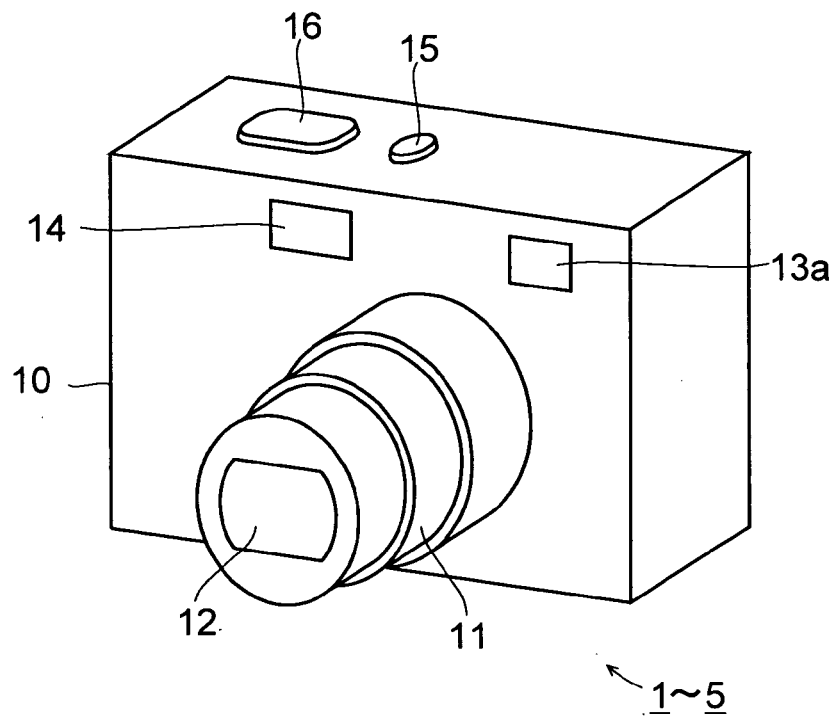
FIGS. 1A and 1B are a perspective view and a back view, respectively, schematically showing the external appearance of the digital camera according to each embodiment.
Figure 1B:
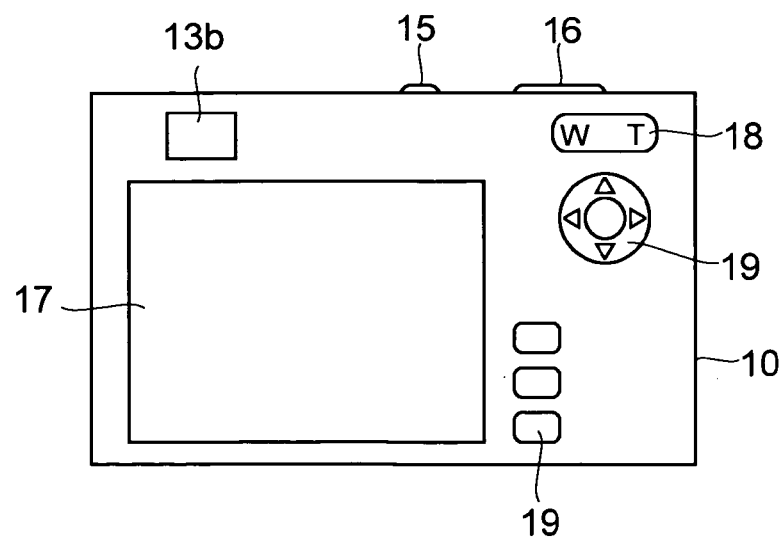

Hereinafter, embodiments of the present invention will be described with reference to the accompanying drawings. FIGS. 1A and 1B schematically show the external appearance of the digital camera 1 according to a first embodiment of the invention. FIG. 1A is a perspective view showing the front and top faces of the digital camera. FIG. 1B is a back view. The digital camera 1 includes a main body 10 and a lens barrel 11 attached to the main body 10. The lens barrel 11 has a plurality of barrel components, and is movable back and forth so that it can project forward when photographing is performed and can be housed in the main body 10 when photographing is not performed. The lens barrel 11 houses and holds a taking optical system 12.

The taking optical system 12 directs the light coming from the subject to an image sensor 21 (see FIG. 2) housed in the main body 10 so as to image the light on the image sensor 21. The focal length of the taking optical system 12 is variable; that is, the taking optical system 12 is a zoom optical system.

The digital camera 1 includes: on its front face, an optical viewfinder objective window 13a and a flash emitter 14; on its top face, a power button 15 and a shutter release button 16; and on its back surface, an optical viewfinder eyepiece window 13b, a display 17, a zoom button 18, and other operation buttons 19. The optical viewfinder provides an optical image of the subject. The flash emitter 14 emits flash light that illuminates a photographic subject. The power button 15 is operated to give an instruction to start or stop the supply of electric power to electrically driven portions including the image sensing element 21. The shutter release button 16 is operated to give an instruction to photograph an image to be recorded.

The display 17 is built with a liquid crystal display, which displays the photographed image and various kinds of information such as the current settings the digital camera 1 and guides for operation. The zoom button 18 is operated to set the focal length of the taking optical system 12. Pressing one end portion of the zoom button 18 changes the focal length in the increasing direction, thereby providing a narrower angle of view and a higher magnification. Pressing the other end portion of the zoom button 18 changes the focal length in the decreasing direction, thereby providing a wider angle of view and a lower magnification. Of the entire range of settable focal lengths of the taking optical system 12, the longest end is referred to as the telephoto end and the shortest end is referred to as the wide-angle end. The operation buttons 19 are operated to make various settings on the digital camera 1.

Figure 2:
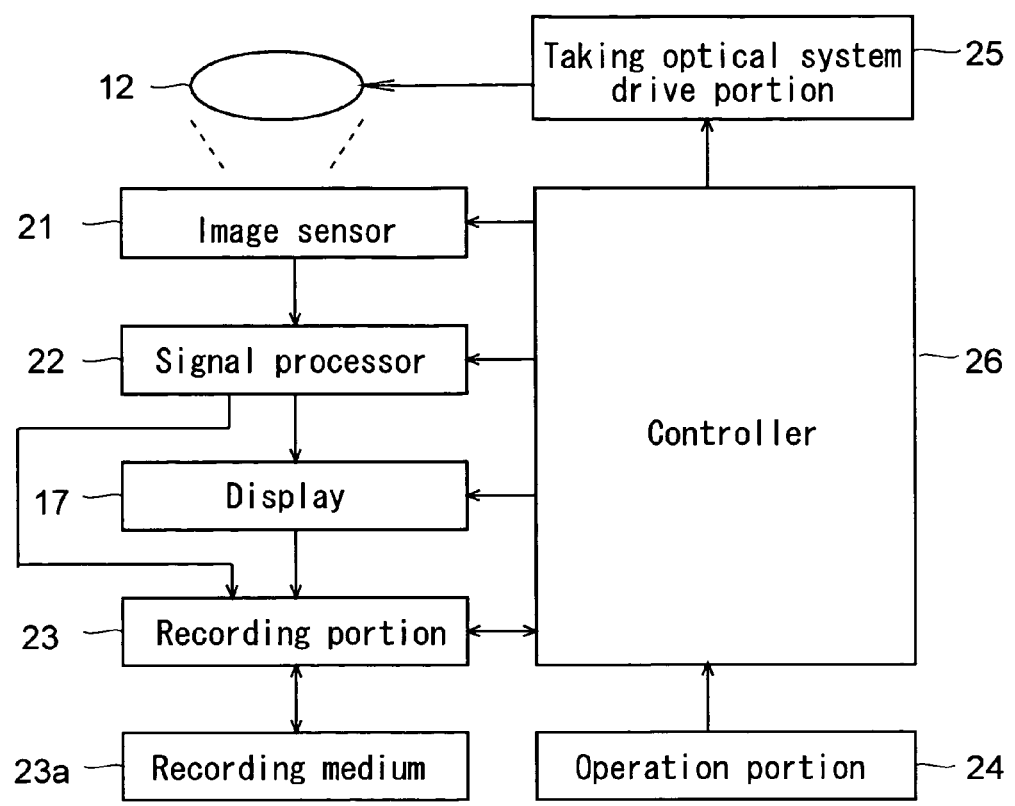
FIG. 2 is a diagram schematically showing the configuration of the digital camera according to each embodiment.

FIG. 2 schematically shows the configuration of the digital camera 1. In addition to the taking optical system 12 and the display 17, the digital camera 1 further includes an image sensor 21, a signal processor 22, a recording portion 23, an operation portion 24, a taking optical system drive portion 25, and a controller 26. The image sensor 21 is a CCD area sensor that outputs a signal indicating the amount of light sensed in each pixel. The signal processor 22 processes the signal outputted by the image sensor 21 to thereby create image data representing the photographed image. The recording portion 23 records the image data generated by the signal processor 22 onto a removable recording medium 23a, and also reads image data from the recording medium 23a so as to play back an image for display. The above-mentioned buttons 16 to 19 are collectively referred to as the operation portion 24 that communicates the operations made by the user to the controller 26.

The taking optical system drive portion 25 includes several motors and a transmission mechanism (not shown) that transmits the drive force exerted by the motors to the lens groups included in the taking optical system 12. The taking optical system drive portion 25 sets the focal length and the focal position of the taking optical system 12. The controller 26 controls the relevant portions in accordance with the instructions fed in through the operation portion 24.

Figure 3:
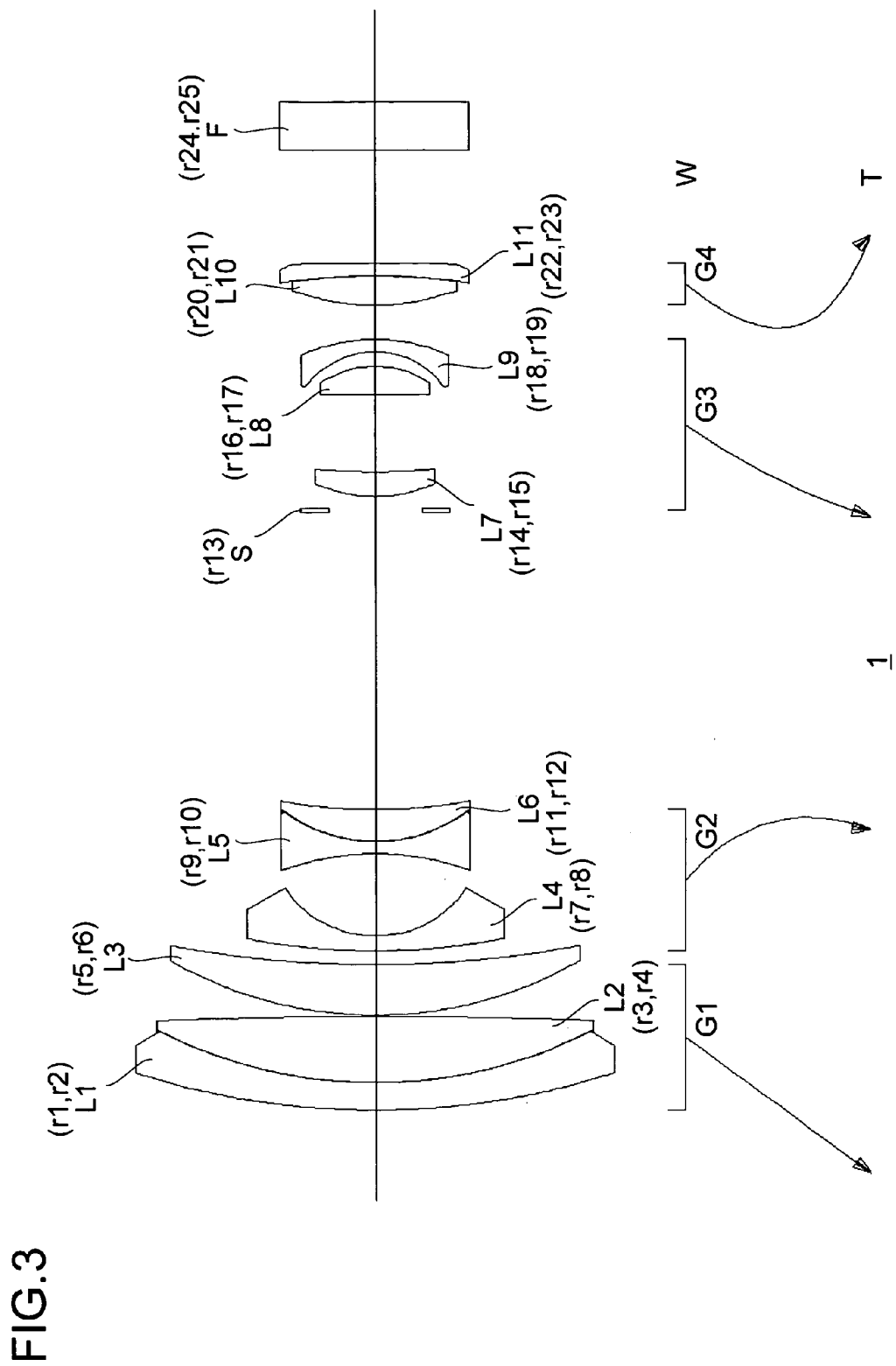
FIG. 3 is a diagram showing the construction of the taking optical system of the digital camera according to a first embodiment of the invention.

FIG. 3 shows the construction of the taking optical system 12. The taking optical system 12 includes, from the subject side, a first lens group G1, a second lens group G2, a third lens group G3, and a forth lens group G4.

The first lens group G1 is composed of three lens elements L1, L2, and L3, and has a positive optical power as a whole. The second lens group G2 is composed of three lens elements L4, L5, and L6, and has a negative optical power as a whole. The third lens group G3 is composed of three lens elements L7, L8, and L9, and has a positive optical power as a whole. The forth lens group G4 is composed of two lens elements L10 and Ll1, and has a positive optical power as a whole.

Between the second lens group G2 and the third lens group G3 is disposed an aperture stop S having a variable aperture diameter. The aperture stop S moves together with the third lens group G3. Immediately in front of the image sensing element 21 is disposed a low-pass filter F.

The symbols r1 to r25 indicated in FIG. 3 represent the surfaces of the lens elements L1 to L11, the aperture stop S, and the filter F. The lens elements L1 to L11 and the filter F each have two surfaces. Of the two surfaces of the same lens element (filter), the one indicated by a symbol with the smaller number is located closer to the subject. For example, the lens L3 has the surfaces r5 and r6, of which the former is located at the subject side and the latter is located at the image sensor 21 side. The aperture stop S has only one surface r13. The medium both in front of and behind the surface r13 of the aperture stop S is air; therefore, there occurs no change in refractive index between in front of and behind the surface r13.

The surface r14 of the lens element L7, the surface r20 of the lens element L10, and the surface r23 of the lens element L11 are all aspheric. The lens elements L1, L3, L4, L6, L7, L8, L9, and L11 are meniscus lens elements. The lens elements L1 and L2 are cemented together, with adhesive applied between the surfaces r2 and r3. The lens elements L5 and L6 are also cemented together, with adhesive applied between the surfaces r10 and r11. Similarly, the lens elements L10 and L11 are cemented together, with adhesive applied between the surfaces r21 and r22.

The arrows indicated in FIG. 3 represent the positions of the lens groups G1 to G4 during zooming. The tails of the arrows correspond to the wide-angle end and the heads of the arrows correspond to the telephoto end. Zooming is achieved by moving the first lens group G1, the second lens group G2, the third lens group G3, and the fourth lens group G4 so as to change the distances between these lens groups. Focusing from an object at infinity to an object at a close distance is achieved by projecting the fourth lens group G4 forward.

The focal length is 6.00 mm at the wide-angle end and 93.00 mm at the telephoto end. The zoom ratio is therefore 15.5. The f-number is 2.88 at the wide-angle end and 4.48 at the telephoto end. The f-number is 3.80 at the middle focal length, i.e., when the focal length is 23.63 mm.

Table 1 shows the construction data of the taking optical system 12. In Table 1, the axial distance given on each line is the axial distance between the surface named on that line and the one named on the line immediately below. Likewise, the refractive index and the Abbe number given on each line are the refractive index and the Abbe number (air is omitted) of the medium present between the surface named on that line and the one named on the line immediately below. The refractive indices and the Abbe numbers listed all relate to the d-line. All the distances listed are given in mm. Of all the axial distances listed, those which vary with zooming are each represented by three values, namely, from left, the value at the wide-angle end, the value at the above-mentioned middle focal length, and the value at the telephoto end. Any aspheric surface is marked with an asterisk (*) that follows the symbol thereof.

TABLE 1

| Surface | Curvature radius | Axial distance | Refractive index | Abbe number |
| --- | --- | --- | --- | --- |
| r1 | 56.592 | 2.000 | 1.84666 | 23.78 |
| r2 | 34.012 | 0.010 | 1.51400 | 42.83 |
| r3 | 34.012 | 4.828 | 1.49700 | 81.61 |
| r4 | −401.072 | 0.100 | | |
| r5 | 29.243 | 3.704 | 1.71300 | 53.94 |
| r6 | 79.633 | 1.000~16.824~28.406 | | |
| r7 | 47.466 | 1.100 | 1.88300 | 40.79 |
| r8 | 7.783 | 6.027 | | |
| r9 | −19.146 | 0.900 | 1.49700 | 81.61 |
| r10 | 10.715 | 0.010 | 1.51400 | 42.83 |
| r11 | 10.715 | 2.340 | 1.84666 | 23.78 |
| r12 | 35.459 | 22.148~5.182~1.153 | | |
| r13 | ∞ | 1.000 | | |
| r14* | 9.256 | 1.823 | 1.49700 | 81.61 |
| r15 | 44.034 | 5.722 | | |
| r16 | −169.730 | 2.019 | 1.49700 | 81.61 |
| r17 | −6.927 | 1.069 | | |
| r18 | −6.076 | 0.900 | 1.71736 | 29.50 |
| r19 | −12.756 | 2.510~4.194~23.349 | | |
| r20* | 15.521 | 2.131 | 1.53048 | 55.72 |
| r21 | −45.628 | 0.010 | 1.51400 | 42.83 |
| r22 | −45.628 | 0.900 | 1.62017 | 24.01 |
| r23* | −1775.757 | 8.251~14.720~1.000 | | |
| r24 | ∞ | 3.500 | 1.51633 | 64.14 |
| r25 | ∞ | 1.000 | | |

An aspheric surface is defined by formula (6) below.

$$X(H) = C \cdot H^2 / \{1 + (1 - \epsilon \cdot C^2 \cdot H^2)^{1/2}\} + \Sigma A k \cdot H^k \quad (6)$$

where H represents the height in a direction normal to the optical axis; X (H) represents the displacement along the optical axis at the height H (relative to the vertex of the surface); C represents the paraxial curvature, $\epsilon$ represents the quadric surface parameter; k represents the order of the aspheric surface; and Ak represents the aspheric coefficient of order k. Table 2 shows the data of the aspheric surfaces.

TABLE 2

Surface r14

$\epsilon = 1.0000$
A4 = −0.15717526 × 10$^{-3}$   A6 = −0.19389654 × 10$^{-5}$   A8 = −0.15573656 × 10$^{-6}$
A10 = 0.69643896 × 10$^{-8}$   A12 = −0.49551177 × 10$^{-9}$ Surface r20

$\epsilon = 1.0000$
A4 = −0.34607537 × 10$^{-4}$   A6 = −0.61736587 × 10$^{-6}$   A8 = 0.36334220 × 10$^{-6}$
A10 = −0.12239069 × 10$^{-7}$ Surface r23

$\epsilon = 1.0000$
A4 = −0.10389724 × 10$^{-4}$   A6 = −0.29111256 × 10$^{-5}$   A8 = 0.64550962 × 10$^{-6}$
A10 = −0.27171011 × 10$^{-7}$   A12 = 0.26629674 × 10$^{-9}$ Let the focal length of the first lens group G1 be f1, the focal length of the second lens group G2 be f2, the focal length of the third lens group G3 be f3, the focal length of the fourth lens group G4 be f4, the focal length of the entire taking optical system 12 at the wide-angle end be fw, and the focal length of the entire taking optical system 12 at the telephoto end be ft. Then, f3/f4=0.6222, f1/fw=7.735, f3/ft=0.2050, and f2/ft=−0.0881. Thus, Formulae (1) to (4) noted earlier are all satisfied, and Formulae (1') to (4') noted earlier, too, are all satisfied.

Let the distance from the surface r1, i.e. the most object side surface of the first lens group G1, to the focal plane as measured at the wide-angle end be TLw. Then, TLw/ft=0.868. Thus, Formula (5) noted earlier is satisfied, and Formula (5') noted earlier, too, is satisfied.

FIGS. 4A to 4I show the aberrations observed in the taking optical system 12. Of these diagrams, FIGS. 4A, 4B, and 4C show the aberrations observed at the wide-angle end, FIGS. 4D, 4E, and 4F show the aberrations observed at the middle focal length, and FIGS. 4G, 4H, and 4I show the aberrations observed at the telephoto end. FIGS. 4A, 4D, and 4G are diagrams showing spherical aberration, FIGS. 4B, 4E, and 4H are diagrams showing astigmatism, and FIGS. 4C, 4F, and 4I are diagrams showing distortion. In the spherical aberration diagrams, the line d represents the spherical aberration observed with the d-line, the line g represents the spherical aberration observed with the g-line, and the line SC represents the deviation from the sine condition. In the astigmatism diagrams, the lines DM and DS represent the astigmatism observed on the meridional and sagittal planes, respectively. All the data plotted are in mm, except that those plotted along the horizontal axis in the distortion diagrams are in percentage.

The taking optical system 12 of the digital camera 1 of this embodiment provides a zoom ratio as high as 15.5; nevertheless, as will be clear from FIGS. 4A to 4I, it corrects aberrations satisfactorily to offer excellent imaging characteristics. Moreover, the taking optical system 12 has a total length as compact as about 74 mm even including the filter F (at the wide-angle end). Furthermore, the taking optical system 12 includes as few as eleven lens elements in total and as few as three aspheric surfaces, and is thus easy to manufacture.

The digital cameras of other embodiments of the invention which are going to be described below differ from that of the first embodiment only in the construction of their taking optical systems. Accordingly, in the following descriptions, overlapping explanations will not omitted, and only the construction of the respective taking optical systems will be dealt with. The same conventions as used in FIGS. 3 to 4I apply to FIGS. 5 to 12I referred to below. Any aspheric surface is defined by Formula (5) noted above, and the same conventions as used in Tables 1 and 2 apply to Tables 3 to 10 presented below.

Figure 5:
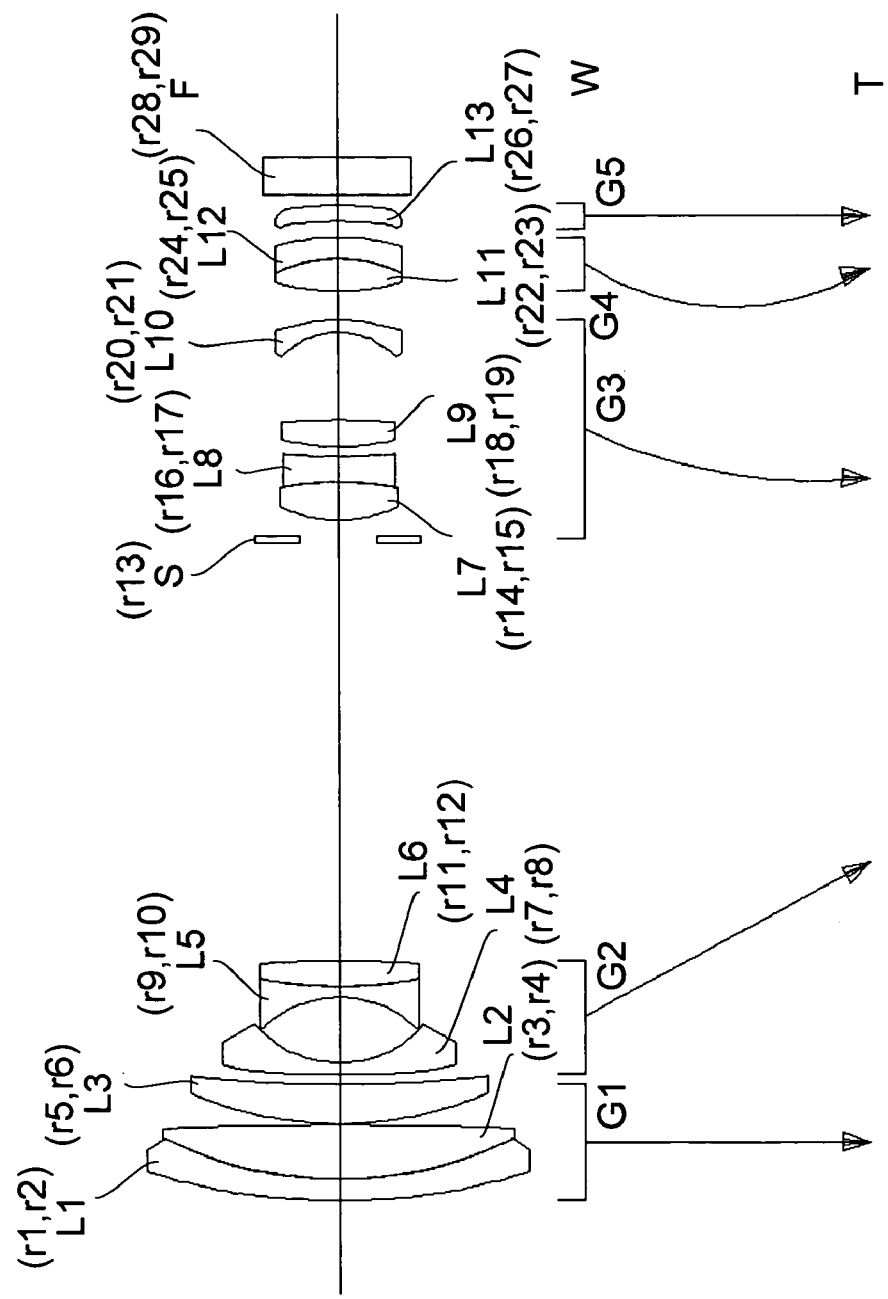
FIG. 5 is a diagram showing the construction of the taking optical system of the digital camera according to a second embodiment of the invention.

FIG. 5 shows the construction of the taking optical system 12 of the digital camera 2 of a second embodiment. The taking optical system 12 of the digital camera 2 includes, from the subject side, a first lens group G1, a second lens group G2, a third lens group G3, a forth lens group G4, and a fifth lens group G5.

The first lens group G1 is composed of three lens elements L1, L2, and L3, and has a positive optical power as a whole. The second lens group G2 is composed of three lens elements L4, L5, and L6, and has a negative optical power as a whole. The third lens group G3 is composed of four lens elements L7, L8, L9, and L10, and has a positive optical power as a whole. The forth lens group G4 is composed of two lens elements L11 and L12, and has a positive optical power as a whole. The fifth lens group G5 is composed of one lens element L13, and has a positive optical power.

Between the second lens group G2 and the third lens group G3 is disposed an aperture stop S. The aperture stop S moves together with the third lens group G3. Immediately in front of the image sensing element 21 is disposed a low-pass filter F.

In this embodiment, the taking optical system 12 includes, from the subject side, surfaces r1 to r29. The surface r7 of the lens element L4, the surface r14 of the lens element L7, the surfaces r20 and r21 of the lens element L10, and the surfaces r26 and r27 of the lens element L13 are all aspheric. The lens elements L1, L3, L4, L10, L12, and L13 are meniscus lens elements. The lens elements L1 and L2, the lens elements L5 and L6, the lens elements L7 and L8, and the lens elements L11 and L12, respectively, are cemented together, with adhesive applied between the surfaces r2 and r3, between the surfaces r10 and r11, between the surfaces r15 and r16, and between the surfaces r23 and r24, respectively.

The first lens group G1 and the fifth lens group G5 are fixed. Zooming is achieved by moving the second lens group G2, the third lens group G3, and the fourth lens group G4. Focusing from an object at infinity to an object at a close distance is achieved by projecting the fourth lens group G4 forward.

The focal length is 6.00 mm at the wide-angle end and 105.00 mm at the telephoto end. The zoom ratio is therefore 17.5. The f-number is 2.88 at the wide-angle end and 4.60 at the telephoto end. The f-number is 4.00 at the middle focal length, i.e., when the focal length is 25.10 mm.

Table 3 shows the construction data of the taking optical system 12. Table 4 show the data related to the aspheric surfaces.

TABLE 3

| Surface | Curvature radius | Axial distance | Refractive index | Abbe number |
|---|---|---|---|---|
| r1 | 59.712 | 2.000 | 1.84666 | 23.78 |
| r2 | 35.515 | 0.010 | 1.51400 | 42.83 |
| r3 | 35.515 | 5.135 | 1.49700 | 81.61 |
| r4 | −351.240 | 0.100 | | |
| r5 | 33.930 | 3.660 | 1.72916 | 54.67 |
| r6 | 106.693 | 1.000~18.762~30.324 | | |
| r7* | 190.681 | 1.100 | 1.77250 | 49.77 |
| r8 | 10.025 | 6.192 | | |
| r9 | −9.809 | 1.000 | 1.49700 | 81.61 |
| r10 | 32.768 | 0.010 | 1.51400 | 42.83 |
| r11 | 32.768 | 2.481 | 1.84666 | 23.78 |
| r12 | −66.763 | 40.107~13.774~1.300 | | |
| r13 | ∞ | 1.800 | | |
| r14* | 10.923 | 3.635 | 1.58913 | 61.25 |
| r15 | −28.036 | 0.010 | 1.51400 | 42.83 |
| r16 | −28.036 | 2.400 | 1.80610 | 33.27 |
| r17 | 45.900 | 1.000 | | |
| r18 | 19.625 | 2.500 | 1.49700 | 81.61 |
| r19 | −57.497 | 8.334 | | |
| r20* | −6.587 | 1.200 | 1.53048 | 55.72 |
| r21* | −13.059 | 2.694~2.883~11.060 | | |
| r22 | 20.706 | 3.076 | 1.48749 | 70.44 |
| r23 | −12.080 | 0.010 | 1.51400 | 42.83 |
| r24 | −12.080 | 2.006 | 1.80518 | 25.46 |
| r25 | −19.021 | 1.482~9.864~2.599 | | |
| r26* | −25.419 | 1.560 | 1.53048 | 55.72 |
| r27* | −18.182 | 1.000 | | |
| r28 | ∞ | 3.500 | 1.51633 | 64.14 |
| r29 | ∞ | 1.000 | | |

TABLE 4

Surface r7

$\epsilon = 1.0000$
$A4 = 0.48037046 \times 10^{-4}$    $A6 = -0.12998324 \times 10^{-8}$    $A8 = -0.32660067 \times 10^{-8}$
$A10 = 0.36726880 \times 10^{-10}$    $A12 = -0.59543386 \times 10^{-13}$ Surface r14

$\epsilon = 1.0000$
$A4 = -0.44372786 \times 10^{-4}$    $A6 = -0.20247616 \times 10^{-6}$    $A8 = 0.43913988 \times 10^{-8}$
$A10 = -0.60699374 \times 10^{-9}$    $A12 = 0.15490022 \times 10^{-10}$ Surface r20

$\epsilon = 1.0000$
$A4 = -0.36655741 \times 10^{-3}$    $A6 = 0.25220861 \times 10^{-4}$    $A8 = 0.17418822 \times 10^{-6}$
$A10 = -0.29126750 \times 10^{-8}$ Surface r21

$\epsilon = 1.0000$
$A4 = -0.24718709 \times 10^{-3}$    $A6 = 0.20036043 \times 10^{-4}$    $A8 = -0.11982312 \times 10^{-6}$ Surface r26

$\epsilon = 1.0000$
$A4 = 0.40122081 \times 10^{-3}$    $A6 = 0.53569246 \times 10^{-5}$    $A8 = -0.31021429 \times 10^{-6}$
$A10 = -0.20511969 \times 10^{-7}$ Surface r27

$\epsilon = 1.0000$
$A4 = 0.67276552 \times 10^{-3}$    $A6 = 0.16243678 \times 10^{-4}$    $A8 = -0.12561839 \times 10^{-5}$
$A10 = -0.67194647 \times 10^{-8}$ Let the focal length of the first lens group G1 be f1, the focal length of the second lens group G2 be f2, the focal length of the third lens group G3 be f3, the focal length of the fourth lens group G4 be f4, the focal length of the entire taking optical system 12 at the wide-angle end be fw, and the focal length of the entire taking optical system 12 at the telephoto end be ft. Then, f3/f4=0.7910, f1/fw=8.155, f3/ft=0.1939, and f2/ft=−0.0883. Thus, Formulae (1) to (4) noted earlier are all satisfied, and Formulae (1') to (4') noted earlier, too, are all satisfied.

Let the distance from the surface r1, i.e. the most object side surface of the first lens group G1, to the focal plane as measured at the wide-angle end be TLw. Then, TLw/ft=1.007.

FIGS. 6A to 6I show the aberrations observed in the taking optical system 12. The taking optical system 12 of the digital camera 2 of this embodiment provides a zoom ratio as high as 17.5; nevertheless, as will be clear from FIGS. 6A to 6I, it corrects aberrations satisfactorily to offer excellent imaging characteristics. Moreover, the taking optical system 12 has a total length as compact as about 106 mm even including the filter F. Furthermore, the taking optical system 12 includes as few as thirteen lens elements in total and as few as six aspheric surfaces, and is thus easy to manufacture.

Figure 7:
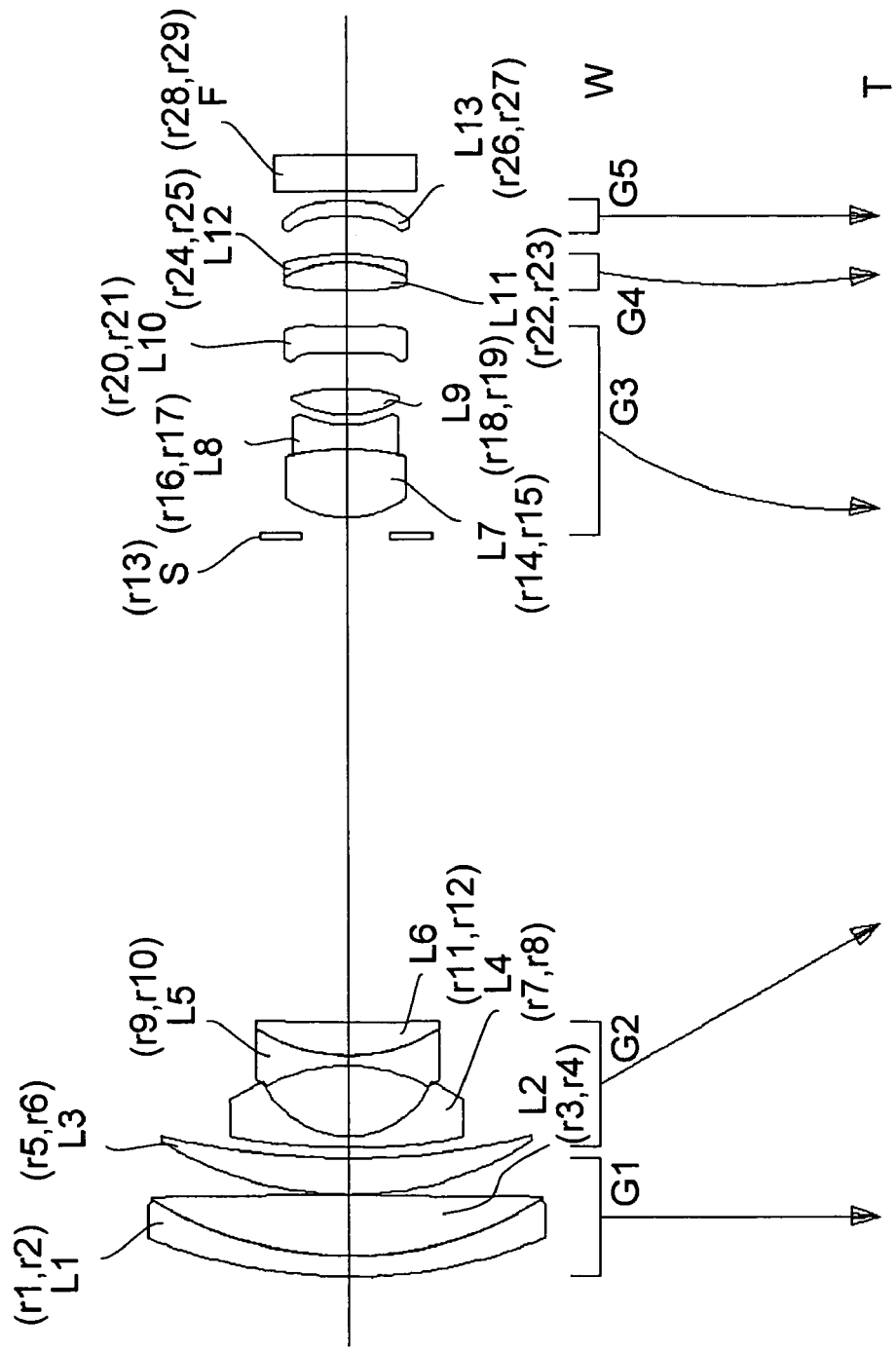
FIG. 7 is a diagram showing the construction of the taking optical system of the digital camera according to a third embodiment of the invention.
Figure 8A:
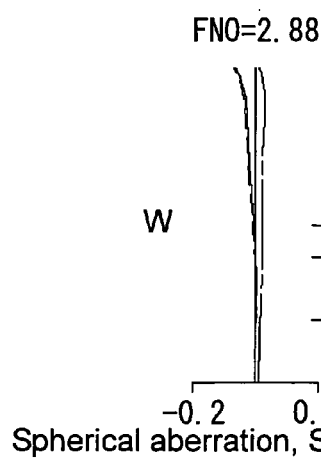
FIGS. 8A to 8I are diagrams showing the aberrations observed in the digital camera according to the third embodiment.
Figure 8B:
Figure 8C:
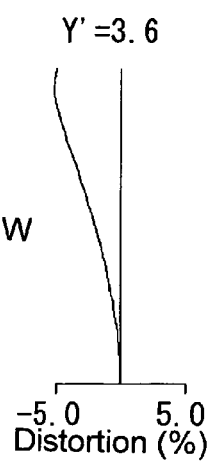
Figure 8D:
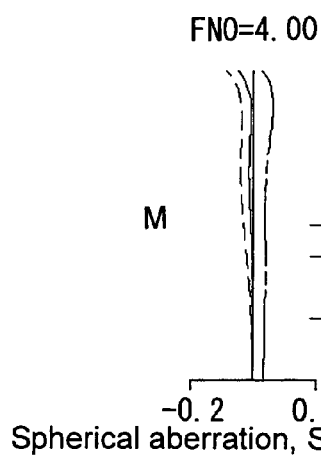
Figure 8E:
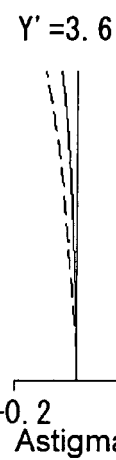
Figure 8F:
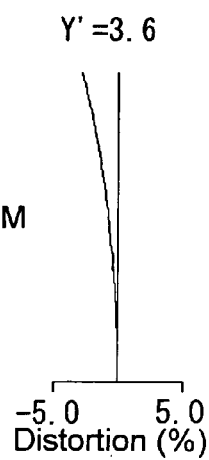
Figure 8G:
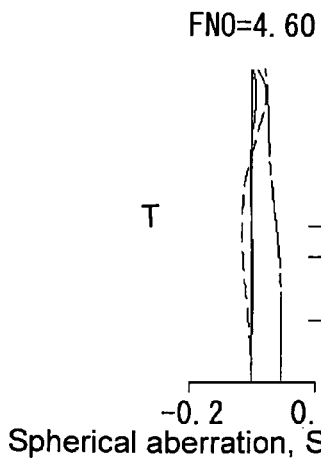
Figure 8H:
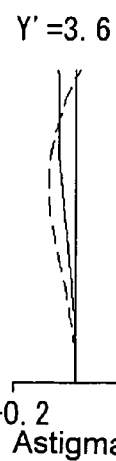
Figure 8I:
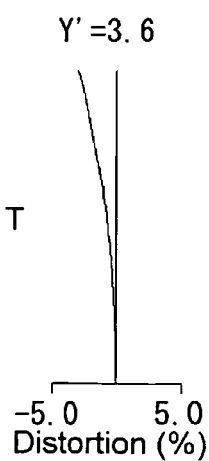

FIG. 7 shows the construction of the taking optical system 12 of the digital camera 3 of a third embodiment. The taking optical system 12 of the digital camera 3 includes, from the subject side, a first lens group G1, a second lens group G2, a third lens group G3, a forth lens group G4, and a fifth lens group G5.

The first lens group G1 is composed of three lens elements L1, L2, and L3, and has a positive optical power as a whole. The second lens group G2 is composed of three lens elements L4, L5, and L6, and has a negative optical power as a whole. The third lens group G3 is composed of four lens elements L7, L8, L9, and L10, and has a positive optical power as a whole. The forth lens group G4 is composed of two lens elements L11 and L12, and has a positive optical power as a whole. The fifth lens group G5 is composed of one lens element L13, and has a negative optical power.

Between the second lens group G2 and the third lens group G3 is disposed an aperture stop S. The aperture stop S moves together with the third lens group G3. Immediately in front of the image sensing element 21 is disposed a low-pass filter F.

In this embodiment, the taking optical system 12 includes, from the subject side, surfaces r1 to r29. The surface r7 of the lens element L4, the surface r14 of the lens element L7, the surfaces r20 and r21 of the lens element L10, and the surfaces r26 and r27 of the lens element L13 are all aspheric. The lens elements L1, L3, L4, L6, L10, L12, and L13 are meniscus lens elements. The lens elements L1 and L2, the lens elements L5 and L6, the lens elements L7 and L8, and the lens elements L11 and L12, respectively, are cemented together, with adhesive applied between the surfaces r2 and r3, between the surfaces r10 and r11, between the surfaces r15 and r16, and between the surfaces r23 and r24, respectively.

The first lens group G1 and the fifth lens group G5 are fixed. Zooming is achieved by moving the second lens group G2, the third lens group G3, and the fourth lens group G4. Focusing from an object at infinity to an object at a close distance is achieved by projecting the fourth lens group G4 forward.

The focal length is 6.00 mm at the wide-angle end and 105.00 mm at the telephoto end. The zoom ratio is therefore 17.5. The f-number is 2.88 at the wide-angle end and 4.60 at the telephoto end. The f-number is 4.00 at the middle focal length, i.e., when the focal length is 25.10 mm.

Table 5 shows the construction data of the taking optical system 12. Table 6 show the data related to the aspheric surfaces.

TABLE 5

| Surface | Curvature radius | Axial distance | Refractive index | Abbe number |
|---|---|---|---|---|
| r1 | 51.264 | 2.00 | 1.846660 | 23.78 |
| r2 | 35.190 | 0.01 | 1.514000 | 42.83 |
| r3 | 35.190 | 5.79 | 1.497000 | 81.61 |
| r4 | −919.485 | 0.10 | | |
| r5 | 33.618 | 3.51 | 1.668292 | 58.46 |
| r6 | 76.757 | 1.00~18.02~32.04 | | |
| r7* | 76.340 | 1.10 | 1.806100 | 33.27 |
| r8 | 8.868 | 6.77 | | |
| r9 | −16.080 | 1.00 | 1.497000 | 81.61 |
| r10 | 15.767 | 0.01 | 1.514000 | 42.83 |
| r11 | 15.767 | 3.24 | 1.846660 | 23.78 |
| r12 | 378.217 | 47.42~17.76~1.32 | | |
| r13 | ∞ | 1.80 | | |
| r14* | 9.091 | 6.64 | 1.589130 | 61.24 |
| r15 | −26.364 | 0.01 | 1.514000 | 42.83 |
| r16 | −26.364 | 2.40 | 1.834224 | 42.58 |
| r17 | 9.829 | 1.00 | | |
| r18 | 9.939 | 2.50 | 1.497000 | 81.61 |
| r19 | −19.027 | 3.52 | | |
| r20* | 76.839 | 2.47 | 1.530480 | 55.72 |
| r21* | 22.045 | 3.51~13.52~18.07 | | |
| r22 | 33.597 | 2.73 | 1.487490 | 70.45 |
| r23 | −13.067 | 0.01 | 1.514000 | 42.83 |
| r24 | −13.067 | 0.80 | 1.765027 | 26.89 |
| r25 | −21.635 | 3.67~6.29~4.16 | | |
| r26* | −17.903 | 1.50 | 1.530480 | 55.72 |
| r27* | −26.647 | 1.00 | | |
| r28 | ∞ | 3.50 | 1.516330 | 64.14 |
| r29 | ∞ | 1.00 | | |

TABLE 6

Surface r7

$\epsilon = 1.0000$
$A4 = 2.49041 \times 10^{-5}$  $A6 = 8.13758 \times 10^{-8}$  $A8 = -4.49554 \times 10^{-9}$
$A10 = 4.73610 \times 10^{-11}$  $A12 = -1.67504 \times 10^{-13}$ Surface r14

$\epsilon = 1.0000$
$A4 = -6.65843 \times 10^{-5}$  $A6 = 2.51873 \times 10^{-7}$  $A8 = -5.29869 \times 10^{-8}$
$A10 = 1.29513 \times 10^{-9}$  $A12 = -1.31597 \times 10^{-11}$ Surface r20

$\epsilon = 1.0000$
$A4 = -1.20828 \times 10^{-3}$  $A6 = -9.85746 \times 10^{-6}$  $A8 = 3.88854 \times 10^{-7}$
$A10 = -1.66592 \times 10^{-8}$ Surface r21

$\epsilon = 1.0000$
$A4 = -1.09887 \times 10^{-3}$  $A6 = 7.22544 \times 10^{-6}$  $A8 = -6.77749 \times 10^{-8}$ Surface r26

$\epsilon = 1.0000$
$A4 = -3.50821 \times 10^{-4}$  $A6 = -1.50755 \times 10^{-5}$  $A8 = 0.00000 \times 10^{0}$ Surface r27

$\epsilon = 1.0000$
$A4 = -6.98374 \times 10^{-4}$  $A6 = -1.05709 \times 10^{-5}$  $A8 = -2.24731 \times 10^{-7}$
$A10 = 1.06287 \times 10^{-8}$  $A12 = 4.53933 \times 10^{-16}$ Let the focal length of the first lens group G1 be f1, the focal length of the second lens group G2 be f2, the focal length of the third lens group G3 be f3, the focal length of the fourth lens group G4 be f4, the focal length of the entire taking optical system 12 at the wide-angle end be fw, and the focal length of the entire taking optical system 12 at the telephoto end be ft. Then, f3/f4=0.6223, f1/fw=9.045, f3/ft=0.2091, and f2/ft=−0.1000. Thus, Formulae (1) to (4) noted earlier are all satisfied, and Formulae (1') to (4') noted earlier, too, are all satisfied.

Let the distance from the surface r1, i.e. the most object side surface of the first lens group G1, to the focal plane as measured at the wide-angle end be TLw. Then, TLw/ft=1.102.

FIGS. 8A to 8I show the aberrations observed in the taking optical system 12. The taking optical system 12 of the digital camera 3 of this embodiment provides a zoom ratio as high as 17.5; nevertheless, as will be clear from FIGS. 8A to 8I, it corrects aberrations satisfactorily to offer excellent imaging characteristics. Moreover, the taking optical system 12 has a total length as compact as about 110 mm even including the filter F. Furthermore, the taking optical system 12 includes as few as thirteen lens elements in total and as few as six aspheric surfaces, and is thus easy to manufacture.

Figure 9:
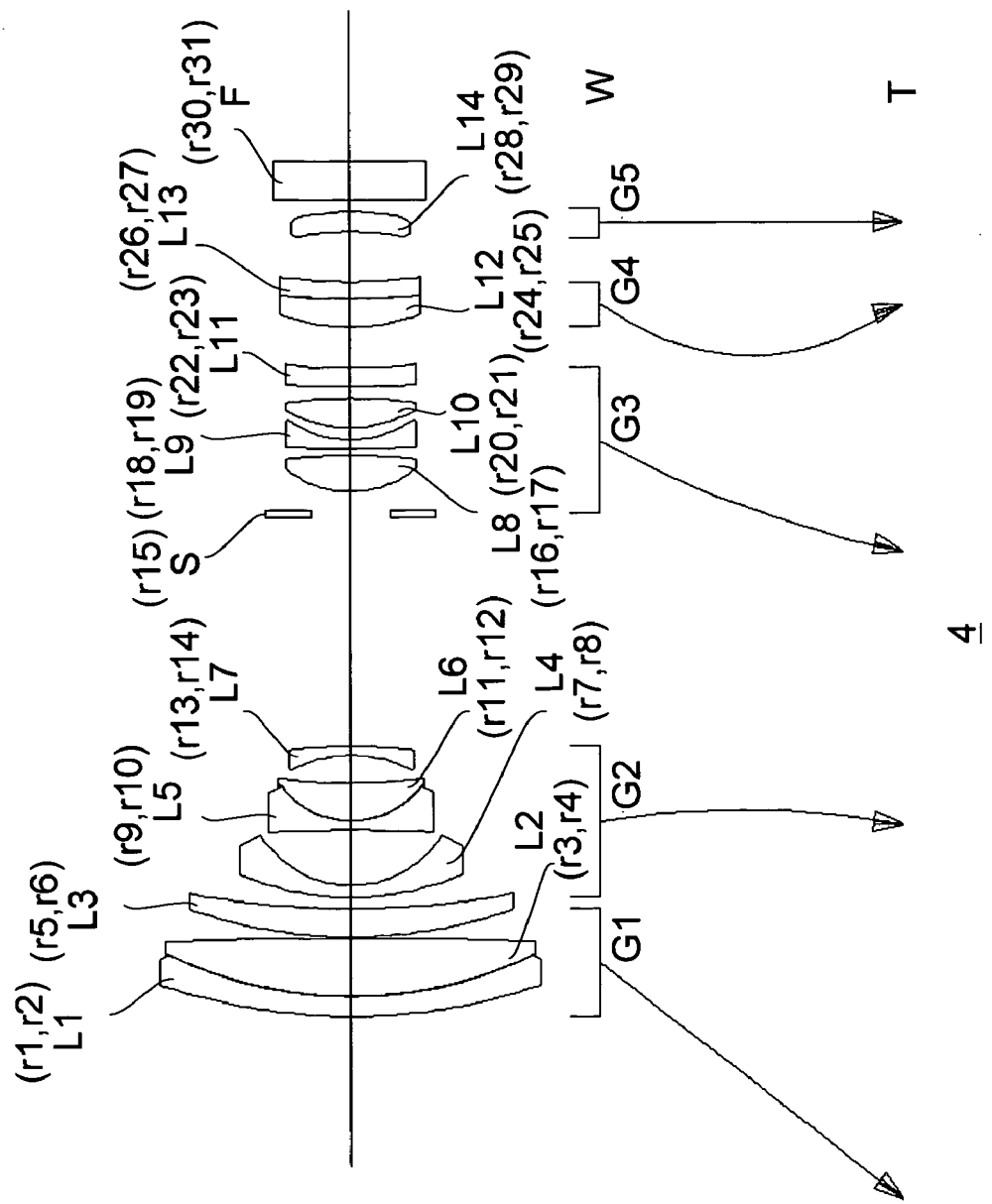
FIG. 9 is a diagram showing the construction of the taking optical system of the digital camera according to a fourth embodiment of the invention.
Figure 10A:
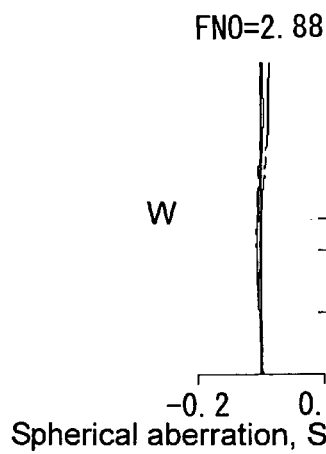
FIGS. 10A to 10I are diagrams showing the aberrations observed in the digital camera according to the fourth embodiment.
Figure 10B:
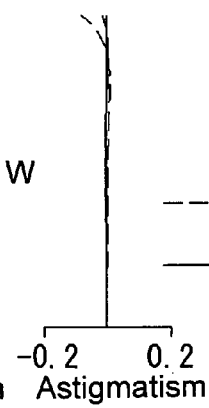
Figure 10C:
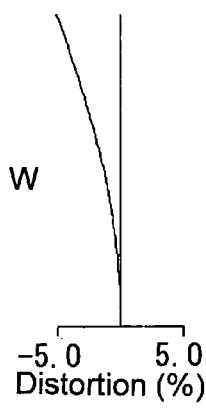
Figure 10D:
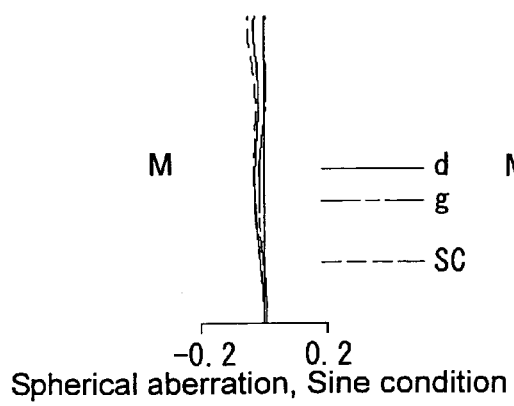
Figure 10E:
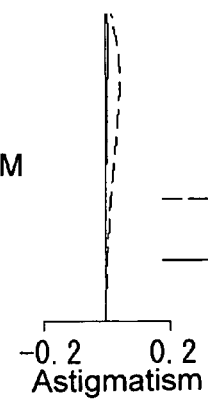
Figure 10F:
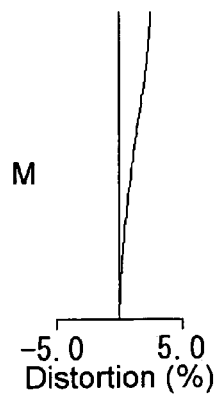
Figure 10G:
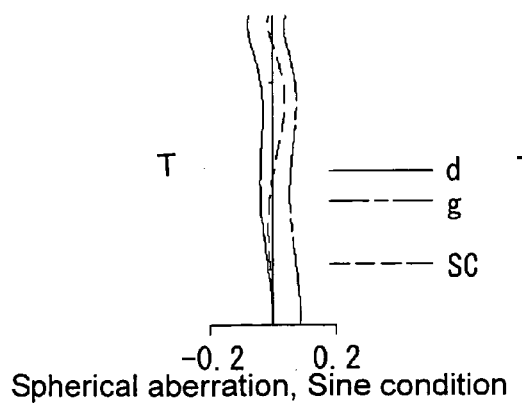
Figure 10H:
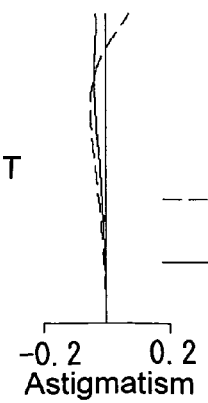
Figure 10I:
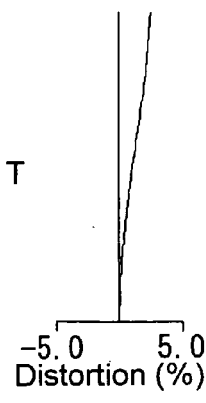

FIG. 9 shows the construction of the taking optical system 12 of the digital camera 4 of a fourth embodiment. The taking optical system 12 of the digital camera 4 includes, from the subject side, a first lens group G1, a second lens group G2, a third lens group G3, a forth lens group G4, and a fifth lens group G5.

The first lens group G1 is composed of three lens elements L1, L2, and L3, and has a positive optical power as a whole. The second lens group G2 is composed of four lens elements L4, L5, L6, and L7, and has a negative optical power as a whole. The third lens group G3 is composed of four lens elements L8, L9, L10, and L11 and has a positive optical power as a whole. The forth lens group G4 is composed of two lens elements L12 and L13, and has a positive optical power as a whole. The fifth lens group G5 is composed of one lens element L14, and has a positive optical power.

Between the second lens group G2 and the third lens group G3 is disposed an aperture stop S. The aperture stop S moves together with the third lens group G3. Immediately in front of the image sensing element 21 is disposed a low-pass filter F.

In this embodiment, the taking optical system 12 includes, from the subject side, surfaces r1 to r31. The surface r16 of the lens element L8, the surfaces r22 and r23 of the lens element L11, and the surfaces r28 and r29 of the lens element L14 are all aspheric. The lens elements L1, L3, L4, L6, L7, L9, L11, L12, L13, and L14 are meniscus lens elements. The lens elements L1 and L2, the lens elements L5 and L6, and the lens elements L12 and L13, respectively, are cemented together, with adhesive applied between the surfaces r2 and r3, between the surfaces r10 and r11, and between the surfaces r25 and r26, respectively.

The fifth lens group G5 is fixed. Zooming is achieved by moving the first lens group G1, the second lens group G2, the third lens group G3, and the fourth lens group G4. Focusing from an object at infinity to an object at a close distance is achieved by projecting the fourth lens group G4 forward.

The focal length is 6.01 mm at the wide-angle end and 104.91 mm at the telephoto end. The zoom ratio is therefore 17.5. The f-number is 2.88 at the wide-angle end and 4.60 at the telephoto end. The f-number is 4.00 at the middle focal length, i.e., when the focal length is 25.11 mm.

Table 7 shows the construction data of the taking optical system 12. Table 8 show the data related to the aspheric surfaces.

TABLE 7

| Surface | Curvature radius | Axial distance | Refractive index | Abbe number |
|---|---|---|---|---|
| r1 | 50.953 | 1.800 | 1.84666 | 23.78 |
| r2 | 36.545 | 0.010 | 1.51400 | 42.83 |
| r3 | 36.545 | 5.184 | 1.49700 | 81.61 |
| r4 | −421.145 | 0.100 | | |
| r5 | 42.190 | 2.525 | 1.62041 | 60.34 |
| r6 | 74.796 | 1.000~22.821~42.652 | | |
| r7 | 23.801 | 1.100 | 1.88300 | 40.79 |
| r8 | 9.396 | 4.963 | | |
| r9 | −148.533 | 0.800 | 1.67003 | 47.20 |
| r10 | 7.727 | 0.010 | 1.51400 | 42.83 |
| r11 | 7.727 | 3.384 | 1.84666 | 23.78 |
| r12 | 46.614 | 2.508 | | |
| r13 | −10.799 | 0.800 | 1.72916 | 54.67 |
| r14 | −50.197 | 20.922~6.389~1.500 | | |
| r15 | ∞ | 2.000 | | |
| r16* | 8.393 | 3.256 | 1.58913 | 61.25 |
| r17 | −47.186 | 0.600 | | |
| r18 | 89.880 | 0.800 | 1.80610 | 33.27 |
| r19 | 9.296 | 1.098 | | |
| r20 | 11.264 | 2.646 | 1.49700 | 81.61 |
| r21 | −37.064 | 1.075 | | |
| r22* | 253.863 | 1.621 | 1.53048 | 55.72 |
| r23* | 221.963 | 3.691~6.824~23.722 | | |
| r24 | 18.159 | 2.508 | 1.49700 | 81.61 |
| r25 | 62.579 | 0.010 | 1.51400 | 42.83 |
| r26 | 62.579 | 1.491 | 1.67003 | 47.20 |
| r27 | 44.935 | 4.450~13.848~4.551 | | |
| r28* | −19.088 | 1.787 | 1.53048 | 55.72 |
| r29* | −14.198 | 1.000~1.000~1.000 | | |
| r30 | ∞ | 3.500 | 1.51633 | 64.14 |
| r31 | ∞ | 1.007 | | |

TABLE 8

Surface r16

$\epsilon = 1.0000$
$A4 = -0.15086371 \times 10^{-3}$   $A6 = -0.43013186 \times 10^{-5}$   $A8 = 0.24186975 \times 10^{-6}$
$A10 = -0.10426824 \times 10^{-7}$   $A12 = 0.15727119 \times 10^{-9}$ Surface r22

$\epsilon = 1.0000$
$A4 = -0.23382801 \times 10^{-4}$   $A6 = 0.44151149 \times 10^{-5}$   $A8 = -0.98965393 \times 10^{-7}$ Surface r23

$\epsilon = 1.0000$
$A4 = 0.18416651 \times 10^{-3}$   $A6 = 0.55132901 \times 10^{-5}$   $A8 = -0.68891492 \times 10^{-7}$
$A10 = 0.45219416 \times 10^{-10}$ Surface r28

$\epsilon = 1.0000$
$A4 = 0.10093154 \times 10^{-2}$   $A6 = -0.35553820 \times 10^{-4}$   $A8 = 0.12710906 \times 10^{-5}$
$A10 = -0.58154686 \times 10^{-7}$ Surface r29

$\epsilon = 1.0000$
$A4 = 0.14841642 \times 10^{-2}$   $A6 = -0.43512515 \times 10^{-4}$   $A8 = 0.11033650 \times 10^{-5}$
$A10 = -0.55064467 \times 10^{-7}$ Let the focal length of the first lens group G1 be f1, the focal length of the second lens group G2 be f2, the focal length of the third lens group G3 be f3, the focal length of the fourth lens group G4 be f4, the focal length of the entire taking optical system 12 at the wide-angle end be fw, and the focal length of the entire taking optical system 12 at the telephoto end be ft. Then, f3/f4=0.2572, f1/fw=11.282, f3/ft=0.1510, and f2/ft=−0.0717. Thus, Formulae (1) to (4) noted earlier are all satisfied, and Formulae (1') to (4') noted earlier, too, are all satisfied.

Let the distance from the surface r1, i.e. the most object side surface of the first lens group G1, to the focal plane as measured at the wide-angle end be TLw. Then, TLw/ft=0.794. Thus, Formula (5) noted earlier is satisfied, and Formula (5') noted earlier, too, is satisfied.

FIGS. 10A to 10I show the aberrations observed in the taking optical system 12. The taking optical system 12 of the digital camera 3 of this embodiment provides a zoom ratio as high as 17.5; nevertheless, as will be clear from FIGS. 10A to 10I, it corrects aberrations satisfactorily to offer excellent imaging characteristics. Moreover, the taking optical system 12 has a total length as compact as about 77 mm even including the filter F (at the wide-angle end). Furthermore, the taking optical system 12 includes as few as fourteen lens elements in total and as few as five aspheric surfaces, and is thus easy to manufacture.

Figure 11:
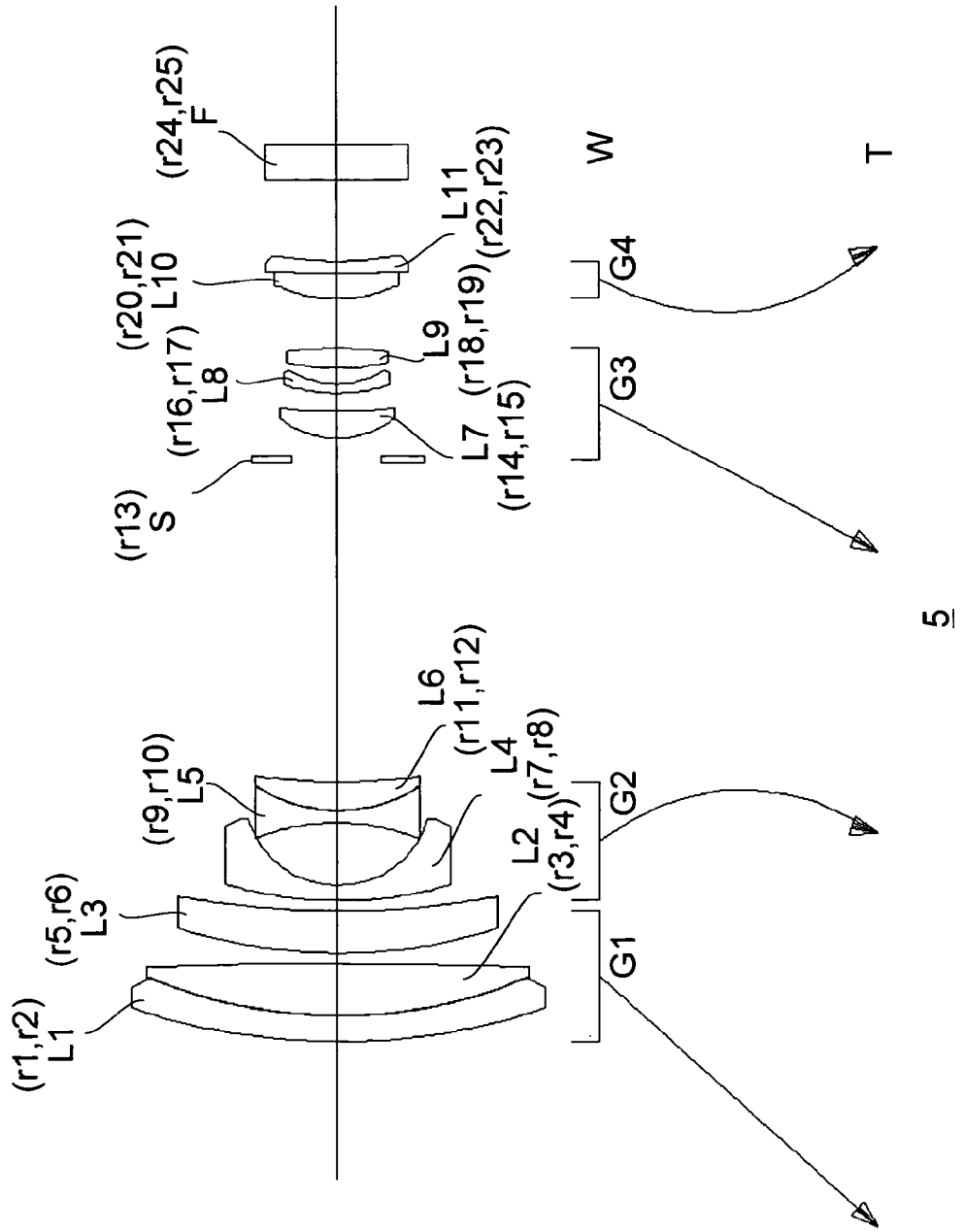
FIG. 11 is a diagram showing the construction of the taking optical system of the digital camera according to a fifth embodiment of the invention.

FIG. 11 shows the construction of the taking optical system 12 of the digital camera 5 of a fifth embodiment. The taking optical system 12 of the digital camera 5 includes, from the subject side, a first lens group G1, a second lens group G2, a third lens group G3, and a forth lens group G4.

The first lens group G1 is composed of three lens elements L1, L2, and L3, and has a positive optical power as a whole. The second lens group G2 is composed of three lens elements L4, L5, and L6, and has a negative optical power as a whole. The third lens group G3 is composed of three lens elements L7, L8, and L9, and has a positive optical power as a whole. The forth lens group G4 is composed of two lens elements L10 and L11, and has a positive optical power as a whole.

Between the second lens group G2 and the third lens group G3 is disposed an aperture stop S. The aperture stop S moves together with the third lens group G3. Immediately in front of the image sensing element 21 is disposed a low-pass filter F.

In this embodiment, the taking optical system 12 includes, from the subject side, surfaces r1 to r25. The surface r14 of the lens element L7, the surface r20 of the lens element L10, and the surface r23 of the lens element L11 are all aspheric. The lens elements L1, L3, L4, L6, L7, L8, L10, and L11 are meniscus lens elements. The lens elements L1 and L2, the lens elements L5 and L6, and the lens elements L10 and L11, respectively, are cemented together, with adhesive applied between the surfaces r2 and r3, between the surfaces r10 and r11, and between the surfaces r21 and r22, respectively.

Zooming is achieved by moving the first lens group G1, the second lens group G2, the third lens group G3, and the fourth lens group G4. Focusing from an object at infinity to an object at a close distance is achieved by projecting the fourth lens group G4 forward.

The focal length is 6.00 mm at the wide-angle end and 117.00 mm at the telephoto end. The zoom ratio is therefore 19.5. The f-number is 2.88 at the wide-angle end and 4.90 at the telephoto end. The f-number is 4.00 at the middle focal length, i.e., when the focal length is 26.50 mm.

Table 9 shows the construction data of the taking optical system 12. Table 10 show the data related to the aspheric surfaces.

TABLE 9

| Surface | Curvature radius | Axial distance | Refractive index | Abbe number |
|---|---|---|---|---|
| r1 | 61.263 | 2.500 | 1.84666 | 23.78 |
| r2 | 45.347 | 0.010 | 1.51400 | 42.83 |
| r3 | 45.347 | 4.992 | 1.49700 | 81.61 |
| r4 | −574.326 | 1.044 | | |
| r5 | 47.758 | 4.095 | 1.58913 | 61.25 |
| r6 | 79.399 | 1.000~28.202~50.891 | | |
| r7 | 37.682 | 1.500 | 1.83400 | 37.34 |
| r8 | 8.819 | 6.021 | | |
| r9 | −20.677 | 1.209 | 1.49700 | 81.61 |
| r10 | 13.479 | 0.010 | 1.51400 | 42.83 |
| r11 | 13.479 | 2.769 | 1.84666 | 23.78 |
| r12 | 55.128 | 31.482~7.120~1.149 | | |
| r13 | ∞ | 2.120 | | |
| r14* | 8.124 | 2.622 | 1.53048 | 55.72 |
| r15 | 46.770 | 1.750 | | |
| r16 | 15.646 | 0.892 | 1.84666 | 23.78 |
| r17 | 8.111 | 1.530 | | |
| r18 | 20.237 | 1.952 | 1.49700 | 81.61 |
| r19 | −32.104 | 4.780~12.754~40.179 | | |
| r20* | 12.844 | 2.455 | 1.53048 | 55.72 |
| r21 | 125.441 | 0.010 | 1.51400 | 42.83 |
| r22 | 125.441 | 1.200 | 1.62017 | 24.01 |
| r23* | 32.666 | 7.751~14.070~1.287 | | |
| r24 | ∞ | 3.500 | 1.51633 | 64.14 |
| r25 | ∞ | 1.000 | | |

TABLE 10

Surface r14

$\epsilon = 1.0000$
$A4 = -0.13682746 \times 10^{-3}$   $A6 = -0.72457285 \times 10^{-6}$   $A8 = -0.87262517 \times 10^{-7}$
$A10 = 0.33174754 \times 10^{-8}$   $A12 = -0.60857073 \times 10^{-10}$ Surface r20

$\epsilon = 1.0000$
$A4 = 0.26498358 \times 10^{-4}$   $A6 = -0.80216661 \times 10^{-5}$   $A8 = 0.47464775 \times 10^{-6}$
$A10 = -0.89457829 \times 10^{-8}$ Surface r23

$\epsilon = 1.0000$
$A4 = 0.84078718 \times 10^{-4}$   $A6 = -0.11462763 \times 10^{-4}$   $A8 = 0.67249678 \times 10^{-6}$
$A10 = -0.10297467 \times 10^{-7}$   $A12 = -0.11715768 \times 10^{-9}$ Let the focal length of the first lens group G1 be f1, the focal length of the second lens group G2 be f2, the focal length of the third lens group G3 be f3, the focal length of the fourth lens group G4 be f4, the focal length of the entire taking optical system 12 at the wide-angle end be fw, and the focal length of the entire taking optical system 12 at the telephoto end be ft. Then, f3/f4=0.5158, f1/fw=13.741, f3/ft=0.1775, and f2/ft=−0.0947. Thus, Formulae (1) to (4) noted earlier are all satisfied, and Formulae (1') to (4') noted earlier, too, are all satisfied.

Let the distance from the surface r1, i.e. the most object side surface of the first lens group G1, to the focal plane as measured at the wide-angle end be TLw. Then, TLw/ft=0.803. Thus, Formula (5) noted earlier is satisfied, and Formula (5') noted earlier, too, is satisfied.

FIGS. 12A to 12I show the aberrations observed in the taking optical system 12. The taking optical system 12 of the digital camera 5 of this embodiment provides a zoom ratio as high as 19.5; nevertheless, as will be clear from FIGS. 12A to 12I, it corrects aberrations satisfactorily to offer excellent imaging characteristics. Moreover, the taking optical system 12 has a total length as compact as about 87 mm even including the filter F (at the wide-angle end). Furthermore, the taking optical system 12 includes as few as eleven lens elements in total and as few as three aspheric surfaces, and is thus easy to manufacture.

The above embodiments have been described, referring to the digital cameras that photograph still images. The taking optical system of the present invention is also applicable to digital cameras that photograph moving images, and cameras built in mobile computers, cellular phones, data processing devices such as data cellular terminals.

Obviously, many modifications and variations of the present invention are possible in light of the above teachings. It is therefore to be understood that within the scope of the appended claims, the invention may be practiced other than as specifically described.

What is claimed is:

1. A taking optical system for focusing light from a subject on an image sensor,
the taking optical system comprising at least, from a subject side, a first lens group having a positive optical power, a second lens group having a negative optical power, a third lens grouphaving a positive optical power, and a fourth lens group having a positive optical power,
the taking optical system achieving zooming by varying at least one distance between the lens groups, wherein the following conditions are fulfilled:

$0.05 < f3/f4 < 0.95,$ $7.0 \leq f1/fw \leq 20.0,$ and $-0.12 \leq f2/ft \leq -0.05,$ where
- f3 represents a focal length of the third lens group;
- f4 represents a focal length of the fourth lens group;
- f1 represents a focal length of the first lens group;
- fw represents a focal length of the entire taking optical system at a wide-angle end thereof;
- f2 represents a focal length of the second lens group; and
- ft represents a focal lenath of the entire taking optical system at a telephoto end thereof.

2. The taking optical system of claim 1, wherein the following condition is fulfilled:

$0.05 \leq f3/ft \leq 0.25.$

3. The taking optical system of claim 1, wherein zooming is achieved by moving at least the second lens group, the third lens group, and the fourth lens group.

4. The taking optical system of claim 1, wherein, in addition to the first to fourth lens groups, there is included only a fifth lens group located closer to an image sensor side than the fourth lens group, and wherein focus adjustment is achieved by moving the fourth lens group.

5. The taking optical system of claim 1, wherein the first lens group is moved to achieve zooming, and wherein the following condition is fulfilled:

$0.5 \leq TLw/ft \leq 1.0,$ where
TLw represents a distance, at the wide-angle end, between a surface of the first lens group located closest to the subject and an image surface.

6. The taking optical system of claim 1, further comprising
between the second lens group and the third lens group an aperture stop that moves together with the third lens group.

7. The taking optical system of claim 1, wherein the third lens group includes a convex lens element that is located closest to the subject and has a positive power, and a meniscus lens element that is located closest to the image sensor and has a negative power.

8. The taking optical system of claim 1, wherein the fourth lens group includes only a cemented lens element formed of a lens element having a positive power and a lens element having a negative power, the lens elements being cemented together by adhesive.

9. An image sensing apparatus comprising:
an image sensor; and
the taking optical system as claimed in claim 1, the taking optical system focusing light from a subject on the image sensor.

* * * * *

UNITED STATES PATENT AND TRADEMARK OFFICE
CERTIFICATE OF CORRECTION

PATENT NO. : 7,206,137 B2 Page 1 of 1
APPLICATION NO. : 11/102051
DATED : April 17, 2007
INVENTOR(S) : Toru Nakatani, Mamoru Terada and Kenshi Nabeta It is certified that error appears in the above-identified patent and that said Letters Patent is hereby corrected as shown below:

Column 18:
Line 45, delete "grouphaving" and insert -- group having --.

Column 19:
Line 2, delete "$0.05 < f3 / f4 < 0.95$," and insert -- $0.05 \leqq f3 / f4 \leqq 0.95$,. --.

Column 19:
Line 14, delete "lenath" and insert -- length --.

Signed and Sealed this

Fifth Day of June, 2007

JON W. DUDAS
*Director of the United States Patent and Trademark Office*